(12) United States Patent
Liao et al.

(10) Patent No.: US 11,423,260 B1
(45) Date of Patent: Aug. 23, 2022

(54) ANOMALY DETECTION METHOD AND APPARATUS FOR MULTI-TYPE DATA

(71) Applicants: Harbin Institute of Technology (Shenzhen) (Shenzhen Institute of Science and Technology Innovation, Harbin Institute of Technology), Guangdong (CN); Dongguan University of Technology, Guangdong (CN)

(72) Inventors: Qing Liao, Guangdong (CN); Binxing Fang, Guangdong (CN); Ye Ding, Guangdong (CN)

(73) Assignees: Harbin Institute of Technology (Shenzhen) (Shenzhen Institute of Science and Technology Innovation, Harbin Institute of Technology), Shenzhen (CN); Dongguan University of Technology, Dongguan (CN)

( * ) Notice: Subject to any disclaimer, the term of this patent is extended or adjusted under 35 U.S.C. 154(b) by 0 days.

(21) Appl. No.: 17/589,888

(22) Filed: Jan. 31, 2022

(30) Foreign Application Priority Data

Feb. 9, 2021 (CN) .......................... 202110181592.1

(51) Int. Cl.
*G06K 9/62* (2022.01)

(52) U.S. Cl.
CPC ......... *G06K 9/6262* (2013.01); *G06K 9/6234* (2013.01); *G06K 9/6277* (2013.01); *G06K 9/6298* (2013.01)

(58) Field of Classification Search
None
See application file for complete search history.

(56) References Cited

FOREIGN PATENT DOCUMENTS

| CN | 107437077 A | 12/2017 |
|----|-------------|---------|
| CN | 111223093 A | 6/2020 |

OTHER PUBLICATIONS

Carrara F, Amato G, Brombin L, Falchi F, Gennaro C. Combining gans and autoencoders for efficient anomaly detection. In2020 25th International Conference on Pattern Recognition (ICPR) Jan. 10, 2021 (pp. 3939-3946). IEEE. (Year: 2021).*

* cited by examiner

*Primary Examiner* — David Perlman

(57) ABSTRACT

The present disclosure provides an anomaly detection method and apparatus for multi-type data. According to the anomaly detection method for multi-type data, an adversarial learning network is trained, so that a generator in the adversarial learning network fits a distribution of a normal training sample and learns a potential mode of the normal training sample, to obtain an updated adversarial learning network, an anomaly evaluation function in the updated adversarial learning network is constructed according to a reconstruction error generated during training, and the updated adversarial learning network is constructed into an anomaly detection model, to perform anomaly detection on inputted detection data by the anomaly detection model, to obtain an anomaly detection result. A mode classifier is introduced to effectively resolve difficult anomaly detection when a distribution of detected data is similar to that of normal data, further improving the accuracy of anomaly detection.

8 Claims, 4 Drawing Sheets

Train an adversarial learning network, to obtain an updated adversarial learning network, where the training an adversarial learning network, to obtain an updated adversarial learning network specifically includes: inputting a feature vector and a mode vector of a normal training sample into the adversarial learning network, performing adversarial learning by using a discriminator and a generator, and updating the generator and the discriminator, so that the generator fits a distribution of the normal training sample; inputting the feature vector and the mode vector after interpolation processing into the adversarial learning network, performing adversarial learning by using an encoder and the generator, and updating the generator and the encoder, so that the generator learns a potential mode of the normal training sample; and repeating the operations to iteratively train the adversarial learning network until a current quantity of iterations reaches a maximum quantity of iterations, to obtain the updated adversarial learning network, where the adversarial learning network includes the generator, the discriminator, and the encoder — S1

Construct an anomaly evaluation function in the updated adversarial learning network according to a reconstruction error generated during training, and construct the updated adversarial learning network into an anomaly detection model — S2

Perform anomaly detection on inputted detection data by using the anomaly detection model, to obtain an anomaly detection result — S3

S1 — Train an adversarial learning network, to obtain an updated adversarial learning network, where the training an adversarial learning network, to obtain an updated adversarial learning network specifically includes: inputting a feature vector and a mode vector of a normal training sample into the adversarial learning network, performing adversarial learning by using a discriminator and a generator, and updating the generator and the discriminator, so that the generator fits a distribution of the normal training sample; inputting the feature vector and the mode vector after interpolation processing into the adversarial learning network, performing adversarial learning by using an encoder and the generator, and updating the generator and the encoder, so that the generator learns a potential mode of the normal training sample; and repeating the operations to iteratively train the adversarial learning network until a current quantity of iterations reaches a maximum quantity of iterations, to obtain the updated adversarial learning network, where the adversarial learning network includes the generator, the discriminator, and the encoder S2 — Construct an anomaly evaluation function in the updated adversarial learning network according to a reconstruction error generated during training, and construct the updated adversarial learning network into an anomaly detection model S3 — Perform anomaly detection on inputted detection data by using the anomaly detection model, to obtain an anomaly detection result

FIG. 1

Input: $X, G, E, D$, iter, nepochs
Output: $G, E, D$

1 Initialize $X, G, E, D$, iter=1, nepochs, $\sigma, c$
2 repeat
3   Sample $z_c$ and $z_n, z_c \sim N(0, \sigma^2), z_n \sim U[1, c]$;
4   Generate an interpolated image $X_{gen} = G(z_c, z_n)$;
5   Calculate $D(X_{gen})$, and then update $G$ according to formula (1)
6   Calculate $D(X)$, and then update $D$ according to formula (1)
7   Perform an interpolation operation, $z_c^{int} = \sum \lambda_i z_c^{(i)}$, $z_n^{int} = \sum \lambda_i z_n^{(i)}$
8   Generate interpolated images in the same mode and between different modes: $X_{same} = G(z_u^{int}, z_c), X_{dif} = G(z_n, z_c^{int})$;
9   Calculate $L_{circle}$ for $X_{same}$ by using formula (2)
10  Calculate a reconstruction error, $L_{recon} = \|X - G(E(X))\|$;
11  Calculate an interpolation error $L_{interpolation}$ for $X_{dif}$ by using formula (3)
12  Update $D$ and $E$ according to formula (4)
13 until iter<nepochs;

FIG. 3

ANOMALY DETECTION METHOD AND APPARATUS FOR MULTI-TYPE DATA

CROSS REFERENCE TO RELATED APPLICATION

The present application claims the benefit of Chinese Patent Application No. 202110181592.1 filed on Feb. 9, 2021, the contents of which are incorporated herein by reference in their entirety.

TECHNICAL FIELD

The present disclosure relates to the field of anomaly detection technologies, and in particular, to an anomaly detection method and apparatus for multi-type data.

BACKGROUND

In recent years, with the increasing amount of data, anomaly detection technologies have attracted extensive attention. At present, proposed anomaly detection algorithms can be roughly classified as an approximation-based anomaly detection algorithm and a model-based anomaly detection algorithm.

The approximation-based anomaly detection algorithm is used to determine whether a test sample is abnormal according to a degree of approximation between the test sample and a normal sample. The approximation-based anomaly detection algorithm requires all normal samples to participate in an operation of the degree of approximation in each anomaly detection. The expansion of data scale also increases the operation pressure, and the approximation-based anomaly detection algorithm is difficult to be applied to a real anomaly detection scenario.

The model-based anomaly detection algorithm is used to learn a feature and a distribution of a normal sample by a large quantity of normal data, and determine whether a test sample is abnormal by calculating a distribution difference between the test sample and a normal sample at a detection stage. The model-based anomaly detection algorithm is usually used to learn the normal sample as a unified mode, ignoring a characteristic that the normal sample includes a variety of potential modes in real life. For example, in X-ray pictures, classified according to sex, samples include male and female modes, and classified according to a body shape, samples include fat and thin modes. It is difficult to accurately capture an effective mode of the normal sample, different from the abnormal sample, and the accuracy of anomaly detection cannot be further improved.

SUMMARY

To overcome the defects of the related art, the present disclosure provides an anomaly detection method and apparatus for multi-type data, which can perform anomaly detection on multi-type data, to further improve the accuracy of anomaly detection.

To resolve the technical problems, according to a first aspect, an embodiment of the present disclosure provides an anomaly detection method for multi-type data, including:

training an adversarial learning network, to obtain an updated adversarial learning network, where the training an adversarial learning network, to obtain an updated adversarial learning network specifically includes:

inputting a feature vector and a mode vector of a normal training sample into the adversarial learning network, performing adversarial learning by a discriminator and a generator, and updating the generator and the discriminator, so that the generator fits a distribution of the normal training sample;

inputting the feature vector and the mode vector after interpolation processing into the adversarial learning network, performing adversarial learning by an encoder and the generator, and updating the generator and the encoder, so that the generator learns a potential mode of the normal training sample; and repeating the operations to iteratively train the adversarial learning network until a current quantity of iterations reaches a maximum quantity of iterations, to obtain the updated adversarial learning network, where the adversarial learning network includes the generator, the discriminator, and the encoder;

constructing an anomaly evaluation function in the updated adversarial learning network according to a reconstruction error generated during training, and constructing the updated adversarial learning network into an anomaly detection model; and performing anomaly detection on inputted detection data by the anomaly detection model, to obtain an anomaly detection result.

Further, before the inputting a feature vector and a mode vector of a normal training sample into the adversarial learning network, performing adversarial learning by a discriminator and a generator, and updating the generator and the discriminator, so that the generator fits a distribution of the normal training sample, the method further includes:

acquiring the feature vector from a feature vector set of the normal training sample, and acquiring the mode vector corresponding to the feature vector from a mode vector set of the normal training sample.

Further, the inputting a feature vector and a mode vector of a normal training sample into the adversarial learning network, performing adversarial learning by a discriminator and a generator, and updating the generator and the discriminator, so that the generator fits a distribution of the normal training sample specifically includes:

inputting the feature vector and the mode vector into the generator, so that the generator generates a first image according to the feature vector and the mode vector;

inputting the first image into the discriminator, and obtaining an anomaly evaluation of the discriminator for the first image;

updating the generator according to the anomaly evaluation, so that the generator fits the distribution of the normal training sample; and inputting the normal training sample into the discriminator, and updating the discriminator with reference to the anomaly evaluation.

Further, the inputting the feature vector and the mode vector after interpolation processing into the adversarial learning network, performing adversarial learning by an encoder and the generator, and updating the generator and the encoder, so that the generator learns a potential mode of the normal training sample specifically includes:

respectively performing interpolation processing on the feature vector and the mode vector, to obtain an interpolated feature vector and an interpolated mode vector;

inputting the interpolated feature vector and the interpolated mode vector into the generator, so that the generator generates a second image and a third image according to the interpolated mode vector and the interpolated feature vector, and respectively calculating current network losses according to the second image and the third image;

inputting the normal training sample into the encoder, so that the encoder reversely inputs an extracted reconstruction feature vector and an extracted reconstruction mode vector into the generator, and calculating a current reconstruction error; and updating the generator and the encoder according to the current network losses and the current reconstruction error, so that the generator learns the potential mode of the normal training sample.

Further, the constructing an anomaly evaluation function in the updated adversarial learning network according to a reconstruction error generated during training, and constructing the updated adversarial learning network into an anomaly detection model specifically includes:

calculating the reconstruction error generated during training, and converting the reconstruction error into a maximum likelihood probability;

constructing the anomaly evaluation function of the updated adversarial learning network according to the maximum likelihood probability; and constructing the updated adversarial learning network into the anomaly detection model after the anomaly evaluation function is constructed.

According to a second aspect, an embodiment of the present disclosure provides an anomaly detection apparatus for multi-type data, including:

an adversarial learning network training module, configured to train an adversarial learning network, to obtain an updated adversarial learning network, where the training an adversarial learning network, to obtain an updated adversarial learning network specifically includes:

inputting a feature vector and a mode vector of a normal training sample into the adversarial learning network, performing adversarial learning by a discriminator and a generator, and updating the generator and the discriminator, so that the generator fits a distribution of the normal training sample;

inputting the feature vector and the mode vector after interpolation processing into the adversarial learning network, performing adversarial learning by an encoder and the generator, and updating the generator and the encoder, so that the generator learns a potential mode of the normal training sample; and repeating the operations to iteratively train the adversarial learning network until a current quantity of iterations reaches a maximum quantity of iterations, to obtain the updated adversarial learning network, where the adversarial learning network includes the generator, the discriminator, and the encoder;

an anomaly detection model construction module, configured to construct an anomaly evaluation function in the updated adversarial learning network according to a reconstruction error generated during training, and construct the updated adversarial learning network into an anomaly detection model; and a data anomaly detection module, configured to perform anomaly detection on inputted detection data by the anomaly detection model, to obtain an anomaly detection result.

Further, before the inputting a feature vector and a mode vector of a normal training sample into the adversarial learning network, performing adversarial learning by a discriminator and a generator, and updating the generator and the discriminator, so that the generator fits a distribution of the normal training sample, the adversarial learning network training module is further configured to:

acquire the feature vector from a feature vector set of the normal training sample, and acquire the mode vector corresponding to the feature vector from a mode vector set of the normal training sample.

Further, the inputting a feature vector and a mode vector of a normal training sample into the adversarial learning network, performing adversarial learning by a discriminator and a generator, and updating the generator and the discriminator, so that the generator fits a distribution of the normal training sample specifically includes:

inputting the feature vector and the mode vector into the generator, so that the generator generates a first image according to the feature vector and the mode vector;

inputting the first image into the discriminator, and obtaining an anomaly evaluation of the discriminator for the first image;

updating the generator according to the anomaly evaluation, so that the generator fits the distribution of the normal training sample; and inputting the normal training sample into the discriminator, and updating the discriminator with reference to the anomaly evaluation.

Further, the inputting the feature vector and the mode vector after interpolation processing into the adversarial learning network, performing adversarial learning by an encoder and the generator, and updating the generator and the encoder, so that the generator learns a potential mode of the normal training sample specifically includes:

respectively performing interpolation processing on the feature vector and the mode vector, to obtain an interpolated feature vector and an interpolated mode vector;

inputting the interpolated feature vector and the interpolated mode vector into the generator, so that the generator generates a second image and a third image according to the interpolated mode vector and the interpolated feature vector, and respectively calculating current network losses according to the second image and the third image;

inputting the normal training sample into the encoder, so that the encoder reversely inputs an extracted reconstruction feature vector and an extracted reconstruction mode vector into the generator, and calculating a current reconstruction error; and updating the generator and the encoder according to the current network losses and the current reconstruction error, so that the generator learns the potential mode of the normal training sample.

Further, the constructing an anomaly evaluation function in the updated adversarial learning network according to a reconstruction error generated during training, and constructing the updated adversarial learning network into an anomaly detection model specifically includes:

calculating the reconstruction error generated during training, and converting the reconstruction error into a maximum likelihood probability;

constructing the anomaly evaluation function of the updated adversarial learning network according to the maximum likelihood probability; and constructing the updated adversarial learning network into the anomaly detection model after the anomaly evaluation function is constructed.

The embodiments of the present disclosure have the following beneficial effects:

An adversarial learning network is trained, so that a generator in the adversarial learning network fits a distribution of a normal training sample and learns a potential mode of the normal training sample, to obtain an updated adversarial learning network, an anomaly evaluation function in the updated adversarial learning network is constructed according to a reconstruction error generated during training, and the updated adversarial learning network is constructed into an anomaly detection model, to perform anomaly detection on inputted detection data by the anomaly detection model, to obtain an anomaly detection result, so that anomaly detection can be performed on multi-type data, thereby improving the accuracy of anomaly detection.

BRIEF DESCRIPTION OF THE DRAWINGS

FIG. 1 is a schematic flowchart of an anomaly detection method for multi-type data according to a first embodiment of the present disclosure.

FIG. 3 is a flowchart of a training algorithm of an adversarial learning network according to a first embodiment of the present disclosure.

DETAILED DESCRIPTION

The technical solutions in the present disclosure are clearly and completely described below with reference to the accompanying drawings in the present disclosure. Apparently, the described embodiments are only a part rather than all of the embodiments of the present disclosure. Based on the embodiments of the present disclosure, all other embodiments obtained by the person of ordinary skill in the art without creative efforts shall fall within the protection scope of the present disclosure.

It should be noted that step numbers in this specification are only intended to facilitate explanation of specific embodiments, and are not used to limit a sequence of steps.

First Embodiment

As shown in FIG. 1, an anomaly detection method for multi-type data provided by a first embodiment includes steps S1 to S3.

S1. Train an adversarial learning network, to obtain an updated adversarial learning network, where the training an adversarial learning network, to obtain an updated adversarial learning network specifically includes:

inputting a feature vector and a mode vector of a normal training sample into the adversarial learning network, performing adversarial learning by a discriminator and a generator, and updating the generator and the discriminator, so that the generator fits a distribution of the normal training sample;

inputting the feature vector and the mode vector after interpolation processing into the adversarial learning network, performing adversarial learning by an encoder and the generator, and updating the generator and the encoder, so that the generator learns a potential mode of the normal training sample; and repeating the operations to iteratively train the adversarial learning network until a current quantity of iterations reaches a maximum quantity of iterations, to obtain the updated adversarial learning network, where the adversarial learning network includes the generator, the discriminator, and the encoder.

S2. Construct an anomaly evaluation function in the updated adversarial learning network according to a reconstruction error generated during training, and construct the updated adversarial learning network into an anomaly detection model.

S3. Perform anomaly detection on inputted detection data by the anomaly detection model, to obtain an anomaly detection result.

It should be noted that the normal training sample is obtained by screening normal data.

Figure 2:
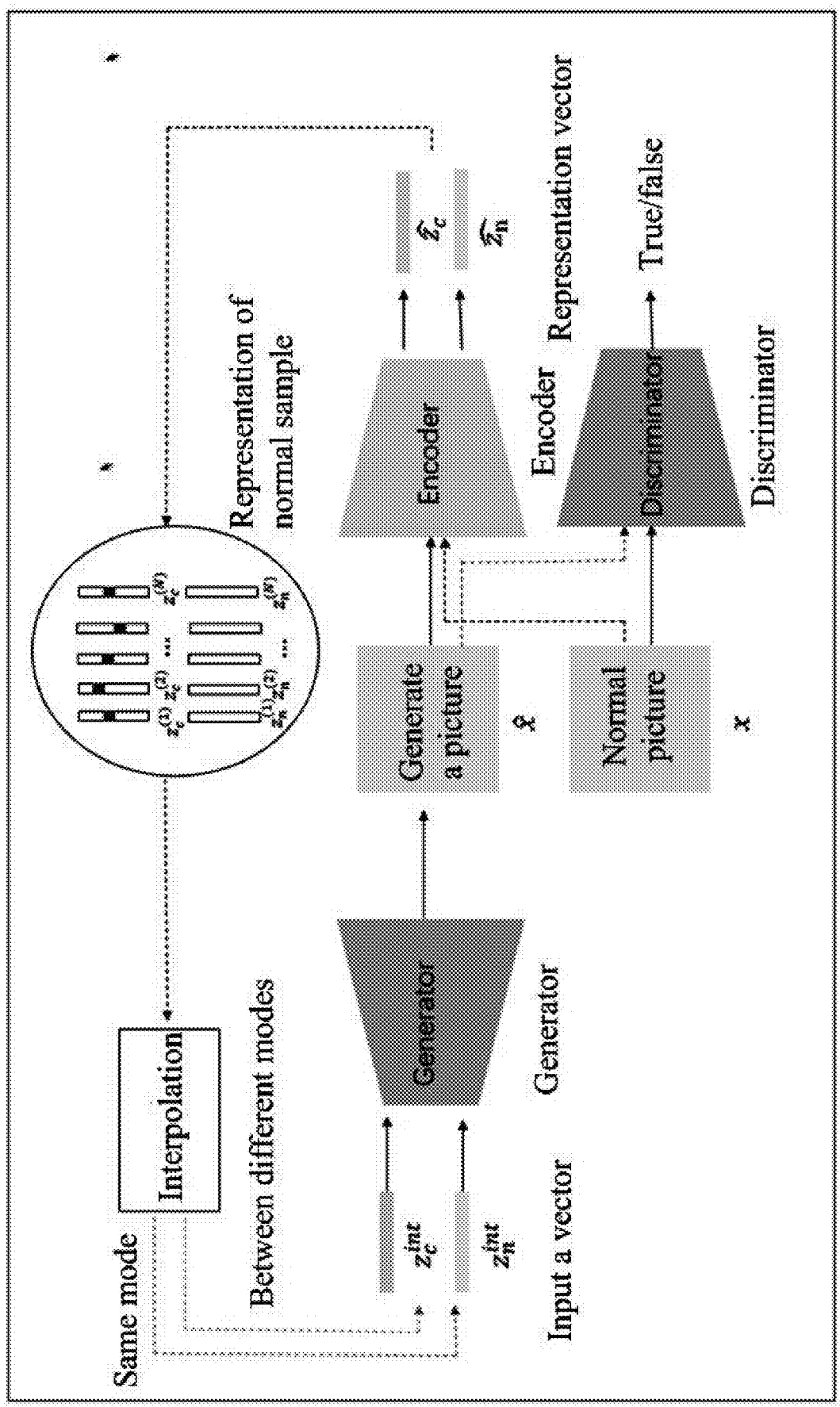
FIG. 2 is a schematic structural diagram of an adversarial learning network according to a first embodiment of the present disclosure.

As shown in FIG. 2, it is assumed that a distribution of normal data is formed by a plurality of modes, the normal data may be represented as a feature vector $z_n$ and a mode vector $z_c$. The feature vector $z_n$ is a d-dimensional vector and is used for indicating a feature representation of the normal data, which is recorded as $z_n \in R_d$; and the mode vector $z_c$ is a c-dimensional 0-1 vector (which is a one-hot vector), and is used for indicating a mode category of the data, which is recorded as $z_c \in E_t$. $E_t$ is used for representing a 0-1 encoding set below. It is assumed that in the normal data, because data has similar feature, the data can be classified as the same mode, so that a common feature representation can be learned. Therefore, a feature of a mode of each normal data may be represented by a Gaussian distribution, that is, $z_{ni} \sim N(0, \sigma^2)$, i=1, ..., d. For convenience of writing, in this embodiment, the feature vector $z_n$ is recorded as $z_n \in N(0, \sigma^2)$, and the feature vector $z_n$ and the mode vector $z_c$ after interpolation processing are respectively represented as an interpolated feature vector $z_n^{int}$ and an interpolated mode vector $z_c^{int}$. The adversarial learning network includes a generator, a discriminator, and an encoder. The generator can generate a corresponding image according to an inputted feature vector and mode vector, that is, $G(\cdot, \cdot):(R^c, R^d) \rightarrow R^n$, where $R^c$ represents a c-dimensional vector set, and the generator mainly aims to fit a distribution of a normal training sample and learns a potential mode of the normal training sample. The encoder reversely learns and extracts a mode and a representation of an inputted image, that is, $E:R^n \rightarrow (R^c, R^d)$. Therefore, mode information and feature representation information of the inputted image may be extracted by the learned encoder, then the mode information and the feature representation information are inputted to the generator, to reconstruct the inputted image, and the encoder extracts the mode information, to instruct the generator to learn the potential mode. The discriminator mainly instructs the generator to fit a distribution of normal data by performing adversarial learning with the generator.

A training process of the adversarial learning network is mainly divided into two stages for iteration. A main objective of a first stage is that the generator fits a distribution of a normal training sample and learns a potential mode of the normal training sample. The generator fits the distribution of the normal training sample by performing adversarial learning with the discriminator and learns the potential mode of the normal training sample by the encoder. A main objective of a second stage is that quality of the potential mode learned at the first stage is evaluated. By verifying whether the currently learned potential mode meets a characteristic of a mode favorable to anomaly detection, mode information favorable to anomaly detection is learned. The two stages are repeated continuously in the entire training process, to instruct the generator to successfully fit the distribution of the normal training sample, and the learned mode converges to a mode that is favorable to anomaly detection.

In a preferred embodiment, before the inputting a feature vector and a mode vector of a normal training sample into the adversarial learning network, performing adversarial learning by a discriminator and a generator, and updating the generator and the discriminator, so that the generator fits a distribution of the normal training sample, the method further includes: acquiring the feature vector from a feature vector set of the normal training sample, and acquiring the mode vector corresponding to the feature vector from a mode vector set of the normal training sample.

In a preferred embodiment, the inputting a feature vector and a mode vector of a normal training sample into the adversarial learning network, performing adversarial learning by a discriminator and a generator, and updating the generator and the discriminator, so that the generator fits a distribution of the normal training sample specifically includes: inputting the feature vector and the mode vector into the generator, so that the generator generates a first image according to the feature vector and the mode vector; inputting the first image into the discriminator, and obtaining an anomaly evaluation of the discriminator for the first image; updating the generator according to the anomaly evaluation, so that the generator fits the distribution of the normal training sample; and inputting the normal training sample into the discriminator, and updating the discriminator with reference to the anomaly evaluation.

In a preferred embodiment, the inputting the feature vector and the mode vector after interpolation processing into the adversarial learning network, performing adversarial learning by an encoder and the generator, and updating the generator and the encoder, so that the generator learns a potential mode of the normal training sample specifically includes: respectively performing interpolation processing on the feature vector and the mode vector, to obtain an interpolated feature vector and an interpolated mode vector; inputting the interpolated feature vector and the interpolated mode vector into the generator, so that the generator generates a second image and a third image according to the interpolated mode vector and the interpolated feature vector, and respectively calculating current network losses according to the second image and the third image; inputting the normal training sample into the encoder, so that the encoder reversely inputs an extracted reconstruction feature vector and an extracted reconstruction mode vector into the generator, and calculating a current reconstruction error; and updating the generator and the encoder according to the current network losses and the current reconstruction error, so that the generator learns the potential mode of the normal training sample.

Exemplarily, FIG. 3 is a flowchart of a training algorithm of an adversarial learning network. Before an adversarial learning network is trained, it is necessary to initialize a generator G, an encoder E, and a discriminator D. iter is a current quantity of steps for iteration, and nepochs is a set maximum quantity of steps for iteration.

First, a batch of feature vectors $z_n$ are sampled from $N(0,\sigma^2)$, and mode categories required to be generated in this batch are sample from evenly distributed $U[1,c]$ and then are converted to one-hot vectors, to obtain mode vectors $z_c$.

Subsequently, the obtained feature vectors $z_n$ and the mode vectors $z_c$ are inputted into the generator, so that the generator generates a batch of fake pictures $X_{gen}$ (that is, first images) according to the feature vectors $z_n$ and the mode vectors $z_c$. The batch of pictures is inputted into the discriminator, an evaluation of the discriminator is obtained, and then the generator is updated, so that the generator fits a distribution of a normal training sample. A real normal training sample is inputted into the discriminator, and the discriminator is updated according to the just evaluation for the fake picture. This process is adversarial learning between the generator and the discriminator.

Subsequently, interpolation processing is performed, and the mode learned at the first stage is evaluated. Interpolation processing is performed on the feature vectors $z_n$, to obtain interpolated feature vectors $z_n^{int}=\Sigma\lambda_i z_n^i$ and interpolated mode vectors $z_c^{int}=z_c$ in the same mode, and interpolation processing is performed on the mode vectors $z_c$, to obtain interpolated feature vectors $z_n^{int}=z_n$ and interpolated mode vectors $z_c^{int}$ between different modes. The vectors are inputted into the generator, so that the generator generates corresponding interpolated images $X_{same}$ (that is, second images) in the same mode and corresponding interpolated images $X_{dif}$ (that is, third images) between different modes. Corresponding network losses $L_{cycle}$ and $L_{interpolation}$ are calculated according to characteristics of different interpolation processing. The real normal training sample is inputted into the encoder, so that the encoder inputs a reconstruction feature vector and a reconstruction mode vector that are extracted from the sample into the generator, to calculate a current reconstruction error. The generator and the encoder are updated according to the network losses and the reconstruction error, and the invalid mode information learned at the first stage is punished.

The steps are repeated until an adversarial learning network model converges or a current quantity of iterations reaches a maximum quantity of iterations.

In FIG. 3, formula (1) is as follows:

$$L_{adv}=E_{z_c\in e_t, z_n\sim N(0,\sigma^2)}\log(1-D(G(z_c,z_n)))+E_{X\sim P_n(x)}\log(D(X)) \quad (1),$$

where in formula (1), $L_{adv}$ is an overall loss function of a current adversarial learning network; $e_t$ is a set of all categories of samples; $G(z_c, z_n)$ is an output image of the generator for $z_c$ and $z_n$, and $D(G(z_c, z_n))$ is an evaluation of the discriminator for the output image of the generator; $P_n(x)=G^*(z_c, z_n)$, and $G^*$ is a current optimal generator; and $D(X)$ is an evaluation of the discriminator for an output image of the current optimal generator.

Formula (2) is as follows:

$$L_{cycle}=E_{Z_c\in e_t, Z_n\sim N(0,\sigma^2)}H(\hat{Z}_c, Z_c)+\|\hat{Z}_n-Z_n\| \quad (2),$$

where in formula (2), $e_t$ is a set of all categories of samples; H is a cross entropy, $(\hat{Z}_c, \hat{Z}_n)=E(G(Z_c,Z_n))$, $\hat{Z}_c$ and $\hat{Z}_n$ are respectively a reconstruction mode vector and a reconstruction feature vector outputted by the encoder.

Formula (3) is as follows:

$$L_{interpolation}=E_{Z_c\notin e_t, Z_n}\sum-\frac{1}{c}\log\hat{Z}_c, \quad (3)$$

where $\hat{Z}_c, \hat{Z}_n=E(G(Z_c, Z_n)),$ where in formula (3), $E_{z_c\notin e_t, z_n}$ is sample $(z_c, z_n)$ not belonging to learning; and c is a quantity of categories.

It is assumed that $z_c$ is a 100-dimensional one-hot vector and can represent 100 different categories, but actually only 10 categories need to be learned. When interpolation processing is performed to randomly generate $z_c$, $z_c$ outside the 10 categories may be generated. In this case, the vectors outside the categories need to be punished by the loss function due to meaningless.

Formula (4) is as follows:

$$L=\alpha L_{interpolation}+\beta L_{cycle}+\gamma L_{recon} \quad (4),$$

where in formula (4), $\alpha$, $\beta$, and $\gamma$ are all preset hyperparameters.

In a preferred embodiment, the constructing an anomaly evaluation function in the updated adversarial learning network according to a reconstruction error generated during training, and constructing the updated adversarial learning network into an anomaly detection model specifically includes: calculating the reconstruction error generated during training, and converting the reconstruction error into a maximum likelihood probability; constructing the anomaly evaluation function of the updated adversarial learning network according to the maximum likelihood probability; and constructing the updated adversarial learning network into the anomaly detection model after the anomaly evaluation function is constructed.

The anomaly detection model is mainly classified as a generation network $p(x;\theta)$ and a mode classification network $q(x;\phi)$ according to a function. A degree of anomaly of a sample may be scored by an anomaly evaluation function, and an operation formula of the anomaly evaluation function is shown in formula (5):

$$A(\chi) = (1 - \log p(\chi;\theta)) * \frac{1}{n_c} - \log p(\chi;\theta) \log q(\chi;\phi), \quad (5)$$

where in formula (5), $n_c$ is a quantity of classified modes, and $$0 \le \log p(p(\chi,\theta)) \le 1, \frac{1}{n_c} \le \log(q(\chi,\phi)) \le 1.$$

A value range of the anomaly evaluation function is $-1 \le A(x) \le -1$, and a larger value indicates a higher degree of anomaly of the sample. Data is actually classified as three categories of normal data, abnormal data far away from a normal distribution, and abnormal data close to the normal distribution by the anomaly evaluation function. For the normal data, there is $\log p(x;\theta)=1$ and the normal data may be roughly classified as any mode, for example, $\log q(x;\phi)=1$. Therefore, there is $A(X)=-1$. For the abnormal data far away from the normal distribution, there is $$\log p(x;\theta) = 0, \log q(x;\theta) = \frac{1}{n_c}.$$

Therefore, $$A(x) = \frac{1}{n_c}.$$

Similarly, for the abnormal data relatively close to the normal distribution, because the generator fails and cannot distinguish the abnormal data from the data, there is $\log(p(x;\phi)))=1$. In this case, $A(x)$ is mainly determined by the second term. Because a classifier can successfully classify such abnormal data as not belonging to any mode, so as to distinguish the abnormal data from the data, there is $A(x)=-1$. A basis for determining anomaly is that weights of the generation network and the mode classification network are mainly determined by a distance between the data and the normal distribution. Because $\log p(x;\theta)$ can reflect a distance between current data and a normal distribution to a certain extent, when the distance is closer, $\log p(x;\theta)$ is more close to 1, and a weight of the second term in $A(x)$ is larger. Therefore, determining depends more on a mode classifier. Conversely, when the data is obviously far from the normal distribution and a difference is relatively large, $A(x)$ mainly depends on the first term, to overcome a high confidence signal outputted when the mode classifier fails.

In a specific implementation of the anomaly detection model, because $\log p(x;\theta)$ is in inverse proportion to the reconstruction error, a smaller reconstruction error of an inputted sample indicates that the sample is more likely to be a normal sample and is more close to a distribution of the normal sample. To establish a probability measure, reconstruction errors of all normal training samples are calculated, to obtain a priori conversion from the reconstruction errors to a maximum likelihood probability, as shown in formula (6):

$$\log(p(\chi;\theta)) \approx p_N(\|X - G(E(X))\|) \quad (6),$$

where in formula (6), PN(•) follows a normal distribution with a mean value being $\mu$ and a variance being $\sigma$. $\mu$ and $\sigma$ are obtained by calculating the reconstruction errors of all the normal training samples, A probability of a mode classification network is mainly implemented by a maximum value of various probabilities outputted by the classifier, as shown in formula (7):

$$\log(q(\chi;\phi)) \approx -\arg\max(p_{\chi \in c_i}(\chi)) \quad (7).$$

Based on the foregoing, the anomaly evaluation function finally constructed by the anomaly detection model is shown in formula (8):

$$A(x) = -(1 - P_N(\|X - G(E(X))\|)) * \frac{1}{n_c} - \quad (8)$$
$$P_N(\|X - G(E(X))\|) \arg\max P_{x \in c_i}(X).$$

Second Embodiment

Figure 4:
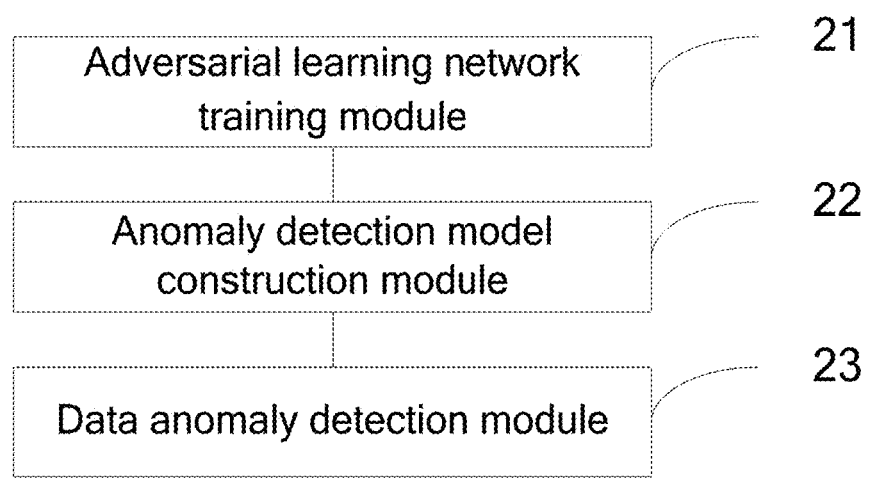
FIG. 4 is a schematic structural diagram of an anomaly detection apparatus for multi-type data according to a second embodiment of the present disclosure.

As shown in FIG. 4, the second embodiment provides an anomaly detection apparatus for multi-type data, including: an adversarial learning network training module 21, configured to train an adversarial learning network, to obtain an updated adversarial learning network, where the training an adversarial learning network, to obtain an updated adversarial learning network specifically includes: inputting a feature vector and a mode vector of a normal training sample into the adversarial learning network, performing adversarial learning by a discriminator and a generator, and updating the generator and the discriminator, so that the generator fits a distribution of the normal training sample; inputting the feature vector and the mode vector after interpolation processing into the adversarial learning network, performing adversarial learning by an encoder and the generator, and updating the generator and the encoder, so that the generator learns a potential mode of the normal training sample; and repeating the operations to iteratively train the adversarial learning network until a current quantity of iterations reaches a maximum quantity of iterations, to obtain the updated adversarial learning network, where the adversarial learning network includes the generator, the discriminator, and the encoder; an anomaly detection model construction module 22, configured to construct an anomaly evaluation function in the updated adversarial learning network according to a reconstruction error generated during training, and construct the updated adversarial learning network into an anomaly detection model; and a data anomaly detection module 23, configured to perform anomaly detection on inputted detection data by the anomaly detection model, to obtain an anomaly detection result.

It should be noted that the normal training sample is obtained by screening normal data.

It is assumed that a distribution of normal data is formed by a plurality of modes, the normal data may be represented as a feature vector $z_n$ and a mode vector $z_c$. The feature vector $z_n$ is a d-dimensional vector and is used for indicating a feature representation of the normal data, which is recorded as $z_n \in R_d$; and the mode vector $z_c$ is a c-dimensional 0-1 vector (which is a one-hot vector), and is used for indicating a mode category of the data, which is recorded as $z_c \in E_t$. $E_t$ is used for representing a 0-1 encoding set below. It is assumed that in the normal data, because data has similar feature, the data can be classified as the same mode, so that a common feature representation can be learned. Therefore, a feature of a mode of each normal data may be represented by a Gaussian distribution, that is, $z_{ni} \sim N(0, \sigma^2)$, i=1, . . . , d. For convenience of writing, in this embodiment, the feature vector $z_n$ is recorded as $z_n \in NN(0, \sigma^2)$, and the feature vector $z_n$ and the mode vector $z_c$ after interpolation processing are respectively represented as an interpolated feature vector $z_n^{int}$ and an interpolated mode vector $z_c^{int}$. The adversarial learning network includes a generator, a discriminator, and an encoder. The generator can generate a corresponding image according to an inputted feature vector and mode vector, that is, $G(\bullet, \bullet):(R^c, R^d) \rightarrow R^n$, where $R^c$ represents a c-dimensional vector set, and the generator mainly aims to fit a distribution of a normal training sample and learns a potential mode of the normal training sample. The encoder reversely learns and extracts a mode and a representation of an inputted image, that is, $E:R^n \rightarrow (R^c, R^d)$. Therefore, mode information and feature representation information of the inputted image may be extracted by the learned encoder, then the mode information and the feature representation information are inputted to the generator, to reconstruct the inputted image, and the encoder extracts the mode information, to instruct the generator to learn the potential mode. The discriminator mainly instructs the generator to fit a distribution of normal data by performing adversarial learning with the generator.

A training process of the adversarial learning network training module 21 for the adversarial learning network is mainly divided into two stages for iteration. A main objective of a first stage is that the generator fits a distribution of a normal training sample and learns a potential mode of the normal training sample. The generator fits the distribution of the normal training sample by performing adversarial learning with the discriminator and learns the potential mode of the normal training sample by the encoder. A main objective of a second stage is that quality of the potential mode learned at the first stage is evaluated. By verifying whether the currently learned potential mode meets a characteristic of a mode favorable to anomaly detection, mode information favorable to anomaly detection is learned. The two stages are repeated continuously in the entire training process, to instruct the generator to successfully fit the distribution of the normal training sample, and the learned mode converges to a mode that is favorable to anomaly detection.

In a preferred embodiment, before the inputting a feature vector and a mode vector of a normal training sample into the adversarial learning network, performing adversarial learning by a discriminator and a generator, and updating the generator and the discriminator, so that the generator fits a distribution of the normal training sample, the adversarial learning network training module is further configured to: acquire the feature vector from a feature vector set of the normal training sample, and acquire the mode vector corresponding to the feature vector from a mode vector set of the normal training sample.

In a preferred embodiment, the inputting a feature vector and a mode vector of a normal training sample into the adversarial learning network, performing adversarial learning by a discriminator and a generator, and updating the generator and the discriminator, so that the generator fits a distribution of the normal training sample specifically includes: inputting the feature vector and the mode vector into the generator, so that the generator generates a first image according to the feature vector and the mode vector; inputting the first image into the discriminator, and obtaining an anomaly evaluation of the discriminator for the first image; updating the generator according to the anomaly evaluation, so that the generator fits the distribution of the normal training sample; and inputting the normal training sample into the discriminator, and updating the discriminator with reference to the anomaly evaluation.

In a preferred embodiment, the inputting the feature vector and the mode vector after interpolation processing into the adversarial learning network, performing adversarial learning by an encoder and the generator, and updating the generator and the encoder, so that the generator learns a potential mode of the normal training sample specifically includes: respectively performing interpolation processing on the feature vector and the mode vector, to obtain an interpolated feature vector and an interpolated mode vector; inputting the interpolated feature vector and the interpolated mode vector into the generator, so that the generator generates a second image and a third image according to the interpolated mode vector and the interpolated feature vector, and respectively calculating current network losses according to the second image and the third image; inputting the normal training sample into the encoder, so that the encoder reversely inputs an extracted reconstruction feature vector and an extracted reconstruction mode vector into the generator, and calculating a current reconstruction error; and updating the generator and the encoder according to the current network losses and the current reconstruction error, so that the generator learns the potential mode of the normal training sample.

Exemplarily, before an adversarial learning network is trained by the adversarial learning network training module 21, it is necessary to initialize a generator G, an encoder E, and a discriminator D.

First, a batch of feature vectors $z_n$ are sampled from $N(0, \sigma^2)$, and mode categories required to be generated in this batch are sample from evenly distributed U[1,c] and then are converted to one-hot vectors, to obtain mode vectors $z_c$.

Subsequently, the obtained feature vectors $z_n$ and the mode vectors $z_c$ are inputted into the generator, so that the generator generates a batch of fake pictures $X_{gen}$ (that is, first images) according to the feature vectors $z_n$ and the mode vectors $z_c$. The batch of fake pictures is inputted into the discriminator, an evaluation of the discriminator is obtained, and then the generator is updated, so that the generator fits a distribution of a normal training sample. A real normal training sample is inputted into the discriminator, and the discriminator is updated according to the just evaluation for the fake picture. This process is adversarial learning between the generator and the discriminator.

Subsequently, interpolation processing is performed, and the mode learned at the first stage is evaluated. Interpolation processing is performed on the feature vectors $z_n$, to obtain interpolated feature vectors $z_n^{int}=\Sigma\lambda_i z_n^i$ and interpolated mode vectors $z_c^{int}=z_c$ in the same mode, and interpolation processing is performed on the mode vectors $z_c$, to obtain interpolated feature vectors $z_n^{int}=z_n$ and interpolated mode vectors $z_c^{int}$ between different modes. The vectors are inputted into the generator, so that the generator generates corresponding interpolated images $X_{same}$ (that is, second images) in the same mode and corresponding interpolated images $X_{dif}$ (that is, third images) between different modes. Corresponding network losses $L_{cycle}$ and $L_{interpolation}$ are calculated according to characteristics of different interpolation processing. The real normal training sample is inputted into the encoder, so that the encoder inputs a reconstruction feature vector and a reconstruction mode vector that are extracted from the sample into the generator, to calculate a current reconstruction error. The generator and the encoder are updated according to the network losses and the reconstruction error, and the invalid mode information learned at the first stage is punished.

The steps are repeated until an adversarial learning network model converges or a current quantity of iterations reaches a maximum quantity of iterations.

In a preferred embodiment, the constructing an anomaly evaluation function in the updated adversarial learning network according to a reconstruction error generated during training, and constructing the updated adversarial learning network into an anomaly detection model specifically includes: calculating the reconstruction error generated during training, and converting the reconstruction error into a maximum likelihood probability; constructing the anomaly evaluation function of the updated adversarial learning network according to the maximum likelihood probability; and constructing the updated adversarial learning network into the anomaly detection model after the anomaly evaluation function is constructed.

The anomaly detection model is mainly classified as a generation network $p(x;\theta)$ and a mode classification network $q(x;\phi)$ according to a function. A degree of anomaly of a sample may be scored by an anomaly evaluation function, and an operation formula of the anomaly evaluation function is shown in formula (9):

$$A(\chi) = (1 - \log p(\chi;\theta)) * \frac{1}{n_c} - \log p(\chi;\theta)\log q(\chi;\phi), \quad (9)$$

where in formula (9), $n_c$ is a quantity of classified modes, and $$0 \leq \log p(p(\chi,\theta)) \leq 1, \frac{1}{n_c} \leq \log(q(\chi,\phi)) \leq 1.$$

A value range of the anomaly evaluation function is $-1 \leq A(x) \leq -1$, and a larger value indicates a higher degree of anomaly of the sample. Data is actually classified as three categories of normal data, abnormal data far away from normal distribution, and abnormal data close to the normal distribution. For the normal data, there is $\log p(x;\theta)=1$, and the normal data may be roughly classified as any mode, for example, $\log q(x;\phi)=1$. Therefore, there is $A(x)=-1$. For the abnormal data far away from the normal distribution, there is $$\log p(x;\theta) = 0, \log q(x;\theta) = \frac{1}{n_c}.$$

Therefore, $$A(x) = -\frac{1}{n_c}.$$

Similarly, for the abnormal data relatively close to the normal distribution, because the generator fails and cannot distinguish the abnormal data from the data, there is $\log(p(x;\phi))=1$. In this case, $A(x)$ is mainly determined by the second term. Because a classifier can successfully classify such abnormal data as not belonging to any mode, so as to distinguish the abnormal data from the data, there is $A(x)=-1$. A basis for determining anomaly is that weights of the generation network and the mode classification network are mainly determined by a distance between the data and the normal distribution. Because $\log p(x;\theta)$ can reflect a distance between current data and a normal distribution to a certain extent, when the distance is closer, $\log p(x;\theta)$ is more close to 1, and a weight of the second term in $A(x)$ is larger. Therefore, determining depends more on a mode classifier. Conversely, when the data is obviously far from the normal distribution and a difference is relatively large, $A(x)$ mainly depends on the first term, to overcome a high confidence signal outputted when the mode classifier fails.

In a specific implementation of the anomaly detection model, because $\log p(x;\theta)$ is in inverse proportion to the reconstruction error, a smaller reconstruction error of an inputted sample indicates that the sample is more likely to be a normal sample and is more close to a distribution of the normal sample. To establish a probability measure, reconstruction errors of all normal training samples are calculated, to obtain a priori conversion from the reconstruction errors to a maximum likelihood probability, as shown in formula (10):

$$\log(p(\chi;\theta)) \approx p_N(\|X-G(E(X))\|) \quad (10),$$

where in formula (10), PN(•) follows a normal distribution with a mean value being $\mu$ and a variance being $\sigma$. $\mu$ and $\sigma$ are obtained by calculating the reconstruction errors of all the normal training samples, A probability of a mode classification network is mainly implemented by a maximum value of various probabilities outputted by the classifier, as shown in formula (11):

$$\log(q(\chi;\phi)) \approx -\arg\max(p_{\chi \in c_i}(\chi)) \quad (11).$$

Based on the foregoing, the anomaly evaluation function finally constructed by the anomaly detection model is shown in formula (12):

$$A(x) = -(1 - P_N(\|X - G(E(X))\|)) * \frac{1}{n_c} - \quad (12)$$
$$P_N(\|X - G(E(X))\|)\arg\max P_{x \in c_i}(X).$$

In another implementation, the anomaly detection apparatus for multi-type data includes a processor, where the processor is configured to execute the above program modules stored in memory, and the program modules include: the adversarial learning network training module 21, the anomaly detection model construction module 22, and the data anomaly detection module 23.

To sum up, the embodiments of the present disclosure have the following beneficial effects:

An adversarial learning network is trained, so that a generator in the adversarial learning network fits a distribution of a normal training sample and learns a potential mode of the normal training sample, to obtain an updated adversarial learning network, an anomaly evaluation function in the updated adversarial learning network is constructed according to a reconstruction error generated during training, and the updated adversarial learning network is constructed into an anomaly detection model, to perform anomaly detection on inputted detection data by the anomaly detection model, to obtain an anomaly detection result, so that anomaly detection can be performed on multi-type data, thereby improving the accuracy of anomaly detection.

The descriptions above are preferred implementations of the present disclosure. It should be noted that for a person of ordinary skill in the art, various improvements and modifications can be made without departing from the principles of the present disclosure. These improvements and modifications should also be regarded as falling into the protection scope of the present disclosure.

A person of ordinary skill in the art can understand that all or some of processes for implementing the foregoing embodiments can be completed by a computer program instructing relevant hardware. The program may be stored in a computer-readable storage medium. When the program is executed, the processes of the foregoing embodiments may be performed. The storage medium may be a magnetic disk, an optical disc, a read-only memory (ROM), a random access memory (RAM), or the like.

The invention claimed is:

1. An anomaly detection method for multi-type data, comprising:

training an adversarial learning network, to obtain an updated adversarial learning network, wherein the training an adversarial learning network, to obtain an updated adversarial learning network specifically comprises:

inputting a feature vector and a mode vector of a normal training sample into the adversarial learning network, performing adversarial learning by a discriminator and a generator, and updating the generator and the discriminator, so that the generator fits a distribution of the normal training sample;

inputting the feature vector and the mode vector after interpolation processing into the adversarial learning network, performing adversarial learning by an encoder and the generator, and updating the generator and the encoder, so that the generator learns a potential mode of the normal training sample, wherein the inputting the feature vector and the mode vector after interpolation processing into the adversarial learning network, performing adversarial learning by an encoder and the generator, and updating the generator and the encoder, so that the generator learns a potential mode of the normal training sample specifically comprises:

respectively performing interpolation processing on the feature vector and the mode vector, to obtain an interpolated feature vector and an interpolated mode vector; inputting the interpolated feature vector and the interpolated mode vector into the generator, so that the generator generates a second image and a third image according to the interpolated feature vector and the interpolated mode vector, and respectively calculating current network losses according to the second image and the third image; inputting the normal training sample into the encoder, so that the encoder reversely inputs an extracted reconstruction feature vector and an extracted reconstruction mode vector into the generator, and calculating a current reconstruction error; and updating the generator and the encoder according to the current network losses and the current reconstruction error, so that the generator learns the potential mode of the normal training sample; and repeating the operations to iteratively train the adversarial learning network until a current quantity of iterations reaches a maximum quantity of iterations, to obtain the updated adversarial learning network, wherein the adversarial learning network comprises the generator, the discriminator, and the encoder;

constructing an anomaly evaluation function in the updated adversarial learning network according to a reconstruction error generated during training, and constructing the updated adversarial learning network into an anomaly detection model, wherein the anomaly evaluation function is used for classifying data as normal data, abnormal data far away from a normal distribution, and abnormal data close to the normal distribution; and performing anomaly detection on inputted detection data by the anomaly detection model, to obtain an anomaly detection result.

2. The anomaly detection method for multi-type data according to claim 1, wherein before the inputting a feature vector and a mode vector of a normal training sample into the adversarial learning network, performing adversarial learning by a discriminator and a generator, and updating the generator and the discriminator, so that the generator fits a distribution of the normal training sample, the method further comprises:

acquiring the feature vector from a feature vector set of the normal training sample, and acquiring the mode vector corresponding to the feature vector from a mode vector set of the normal training sample.

3. The anomaly detection method for multi-type data according to claim 1, wherein the inputting a feature vector and a mode vector of a normal training sample into the adversarial learning network, performing adversarial learning by a discriminator and a generator, and updating the generator and the discriminator, so that the generator fits a distribution of the normal training sample specifically comprises:

inputting the feature vector and the mode vector into the generator, so that the generator generates a first image according to the feature vector and the mode vector;

inputting the first image into the discriminator, and obtaining an anomaly evaluation of the discriminator for the first image;

updating the generator according to the anomaly evaluation, so that the generator fits the distribution of the normal training sample; and inputting the normal training sample into the discriminator, and updating the discriminator with reference to the anomaly evaluation.

4. The anomaly detection method for multi-type data according to claim 1, wherein the constructing an anomaly evaluation function in the updated adversarial learning network according to a reconstruction error generated during training, and constructing the updated adversarial learning network into an anomaly detection model specifically comprises:

calculating the reconstruction error generated during training, and converting the reconstruction error into a maximum likelihood probability;

constructing the anomaly evaluation function of the updated adversarial learning network according to the maximum likelihood probability; and constructing the updated adversarial learning network into the anomaly detection model after the anomaly evaluation function is constructed.

5. An anomaly detection apparatus for multi-type data, comprising:

an adversarial learning network training module, configured to train an adversarial learning network, to obtain an updated adversarial learning network, wherein the training an adversarial learning network, to obtain an updated adversarial learning network specifically comprises:

inputting a feature vector and a mode vector of a normal training sample into the adversarial learning network, performing adversarial learning by a discriminator and a generator, and updating the generator and the discriminator, so that the generator fits a distribution of the normal training sample;

inputting the feature vector and the mode vector after interpolation processing into the adversarial learning network, performing adversarial learning by an encoder and the generator, and updating the generator and the encoder, so that the generator learns a potential mode of the normal training sample, wherein the inputting the feature vector and the mode vector after interpolation processing into the adversarial learning network, performing adversarial learning by an encoder and the generator, and updating the generator and the encoder, so that the generator learns a potential mode of the normal training sample specifically comprises: respectively performing interpolation processing on the feature vector and the mode vector, to obtain an interpolated feature vector and an interpolated mode vector; inputting the interpolated feature vector and the interpolated mode vector into the generator, so that the generator generates a second image and a third image according to the interpolated feature vector and the interpolated mode vector, and respectively calculating current network losses according to the second image and the third image; inputting the normal training sample into the encoder, so that the encoder reversely inputs an extracted reconstruction feature vector and an extracted reconstruction mode vector into the generator, and calculating a current reconstruction error; and updating the generator and the encoder according to the current network losses and the current reconstruction error, so that the generator learns the potential mode of the normal training sample; and repeating the operations to iteratively train the adversarial learning network until a current quantity of iterations reaches a maximum quantity of iterations, to obtain the updated adversarial learning network, wherein the adversarial learning network comprises the generator, the discriminator, and the encoder;

an anomaly detection model construction module, configured to construct an anomaly evaluation function in the updated adversarial learning network according to a reconstruction error generated during training, and construct the updated adversarial learning network into an anomaly detection model, wherein the anomaly evaluation function is used for classifying data as normal data, abnormal data far away from a normal distribution, and abnormal data close to the normal distribution; and a data anomaly detection module, configured to perform anomaly detection on inputted detection data by the anomaly detection model, to obtain an anomaly detection result.

6. The anomaly detection apparatus for multi-type data according to claim 5, wherein before the inputting a feature vector and a mode vector of a normal training sample into the adversarial learning network, performing adversarial learning by a discriminator and a generator, and updating the generator and the discriminator, so that the generator fits a distribution of the normal training sample, the adversarial learning network training module is further configured to:

acquire the feature vector from a feature vector set of the normal training sample, and acquire the mode vector corresponding to the feature vector from a mode vector set of the normal training sample.

7. The anomaly detection apparatus for multi-type data according to claim 5, wherein the inputting a feature vector and a mode vector of a normal training sample into the adversarial learning network, performing adversarial learning by a discriminator and a generator, and updating the generator and the discriminator, so that the generator fits a distribution of the normal training sample specifically comprises:

inputting the feature vector and the mode vector into the generator, so that the generator generates a first image according to the feature vector and the mode vector;

inputting the first image into the discriminator, and obtaining an anomaly evaluation of the discriminator for the first image;

updating the generator according to the anomaly evaluation, so that the generator fits the distribution of the normal training sample; and inputting the normal training sample into the discriminator, and updating the discriminator with reference to the anomaly evaluation.

8. The anomaly detection apparatus for multi-type data according to claim 5, wherein the constructing an anomaly evaluation function in the updated adversarial learning network according to a reconstruction error generated during training, and constructing the updated adversarial learning network into an anomaly detection model specifically comprises:

calculating the reconstruction error generated during training, and converting the reconstruction error into a maximum likelihood probability;

constructing the anomaly evaluation function of the updated adversarial learning network according to the maximum likelihood probability; and constructing the updated adversarial learning network into the anomaly detection model after the anomaly evaluation function is constructed.

* * * * *